United States Patent
Takeuchi (10) Patent No.: US 8,541,966 B2
(45) Date of Patent: Sep. 24, 2013

(54) PWM CONTROL CIRCUIT AND PWM CONTROL METHOD

(71) Applicant: Seiko Epson Corporation, Tokyo (JP)

(72) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/648,621

(22) Filed: Oct. 10, 2012

(65) Prior Publication Data
US 2013/0033208 A1  Feb. 7, 2013

Related U.S. Application Data

(63) Continuation of application No. 13/190,507, filed on Jul. 26, 2011, now Pat. No. 8,310,184, which is a continuation of application No. 12/257,817, filed on Oct. 24, 2008, now Pat. No. 8,018,184.

(30) Foreign Application Priority Data

Nov. 2, 2007 (JP) ................................. 2007-286447

(51) Int. Cl.
*H02P 6/16* (2006.01)
*H02P 6/00* (2006.01)
*H02P 27/04* (2006.01)
*G05B 11/28* (2006.01)

(52) U.S. Cl.
USPC ................. 318/400.04; 318/400.35; 318/599; 318/811

(58) Field of Classification Search
USPC ............................ 318/400.04, 400.35, 599, 811
See application file for complete search history.

(56) References Cited

U.S. PATENT DOCUMENTS

| | | | |
|---|---|---|---|
| 4,673,888 A | 6/1987 | Engelmann et al. | |
| 4,961,130 A | 10/1990 | Kirchberg, Jr. | |
| 5,450,521 A | 9/1995 | Redlich | |
| 6,912,901 B1 | 7/2005 | Nozoe et al. | |
| 7,043,988 B2 | 5/2006 | Nozoe et al. | |
| 7,095,155 B2 | 8/2006 | Takeuchi | |
| 7,105,772 B2 * | 9/2006 | Houston et al. ........... | 219/130.51 |
| 7,205,916 B1 * | 4/2007 | Stolan ........................... | 341/111 |
| 7,211,974 B2 | 5/2007 | Takeuchi | |
| 7,250,740 B2 | 7/2007 | Katsuki et al. | |
| 7,411,365 B2 * | 8/2008 | Kurosawa et al. ........ | 318/400.32 |
| 7,528,583 B2 | 5/2009 | Takeuchi | |
| 7,906,930 B2 | 3/2011 | Takeuchi et al. | |
| 7,915,843 B2 | 3/2011 | Mishima et al. | |
| 8,093,846 B2 | 1/2012 | Mishima et al. | |
| 2006/0220603 A1 | 10/2006 | Takeuchi | |
| 2006/0244409 A1 | 11/2006 | Takeuchi et al. | |
| 2007/0188121 A1 | 8/2007 | Takeuchi | |

FOREIGN PATENT DOCUMENTS

| | | |
|---|---|---|
| JP | 59-061462 | 4/1984 |
| JP | 62-126888 | 6/1987 |
| JP | 04-058780 | 2/1992 |
| JP | 06-165572 | 6/1994 |
| JP | 058-266084 | 10/1996 |
| JP | 2001-298982 | 10/2001 |
| JP | 2002-084772 | 3/2002 |
| JP | 2002-242213 | 8/2002 |
| JP | 2007-053895 | 3/2007 |
| JP | 2007-060862 | 3/2007 |

* cited by examiner

*Primary Examiner* — Eduardo Colon Santana
*Assistant Examiner* — Gabriel Agared
(74) *Attorney, Agent, or Firm* — Harness, Dickey & Pierce, P.L.C.

(57) ABSTRACT

The PWM control circuit includes a polarity determination unit, a full wave rectification unit, an adjustment unit that generates an adjusted waveform signal by adjusting waveform of the full wave rectification signal, and a carrier signal generating unit that generates a fixed frequency carrier signal. The PWM control circuit further includes a comparator that generates an original PWM signal by comparing the adjusted waveform signal and the carrier signal, and a PWM waveform shaping unit that generates a first PWM signal for the positive polarity section and a second PWM signal for the negative polarity section, by shaping the original PWM signal according to the polarity signal.

14 Claims, 13 Drawing Sheets

Fig.2B BACK ELECTROMOTIVE FORCE Ec

Fig.2C SENSOR OUTPUT SSA

POSITION WHEN NOT EXCITED
(PHASE= $\alpha \pm n\pi$)

SSA

Swave

NORMAL STATE

Fig.8B

EXAMPLE OF PULSE WIDTH ADJUSTMENT
USING SENSOR SIGNAL OFFSET/GAIN ADJUSTMENT

Fig.9A

NORMAL STATE

Fig.9B

EXAMPLE OF PULSE WIDTH ADJUSTMENT
USING SAWTOOTH WAVE ADJUSTMENT

Fig.13

PWM CONTROL CIRCUIT AND PWM CONTROL METHOD

CROSS-REFERENCE TO RELATED APPLICATIONS

The is a continuation application of Ser. No. 13/190,507 filed Jul. 26, 2011, which is a continuation application of U.S. Ser. No. 12/257,817 filed Oct. 24, 2008, now U.S. Pat. No. 8,018,184 issued Sep. 13, 2011, which claims priority based on Japanese Patent Application No. 2007-286447 filed on Nov. 2, 2007, all of which are hereby incorporated by reference in their entireties.

BACKGROUND OF THE INVENTION

1. Field of the Invention

The present invention relates to a PWM control circuit used in motors and the like.

2. Description of the Related Art

A PWM control circuit is described, for example, in JP2002-84772A.

With conventional PWM control circuits for motor control, PWM signals are generated by comparing a sine wave signal generated from the motor sensor output and a triangular signal as a reference signal. However, there has been demand for a PWM control circuit that would further increase the motor efficiency. This kind of demand is not limited to PWM control circuits for motor control, but is also an issue common to general PWM control circuits.

SUMMARY OF THE INVENTION

An object of the invention is to provide technology that makes possible PWM control with better efficiency.

According to an aspect of the present invention, there is provided a PWM control circuit that generates PWM signals based on an analog sensor output from a sensor provided in a device to be controlled. The PWM control circuit includes a polarity determination unit that judges positive polarity sections and negative polarity sections of the analog sensor output to generate a polarity signal, a full wave rectification unit that generates a full wave rectification signal by doing full rectification of the analog sensor output, an adjustment unit that generates an adjusted waveform signal by adjusting waveform of the full wave rectification signal, and a carrier signal generating unit that generates a fixed frequency carrier signal. The PWM control circuit further includes a comparator that generates an original PWM signal by comparing the adjusted waveform signal and the carrier signal, and a PWM waveform shaping unit that generates a first PWM signal for the positive polarity section and a second PWM signal for the negative polarity section, by shaping the original PWM signal according to the polarity signal.

With this PWM control circuit, the full wave rectification signal is generated from the analog sensor output, and the adjusted waveform signal is generated by adjusting this full wave rectification signal, so it is possible to obtain a signal with a desirable waveform. Also, the PWM signal is generated using this adjusted waveform signal, so more efficient PWM control is possible.

Note that the present invention can be realized with various modes, for example, it can be realized with modes such as a PWM control circuit and method, an electric motor and the control method thereof, or an actuator, device, portable device, electronic device, mobile body, robot or the like that use these.

DESCRIPTION OF THE PREFERRED EMBODIMENT

Next, we will describe modes of implementing the present invention in the following sequence.

A. Embodiment
B. Variation Example

A. Embodiment

Figure 1:
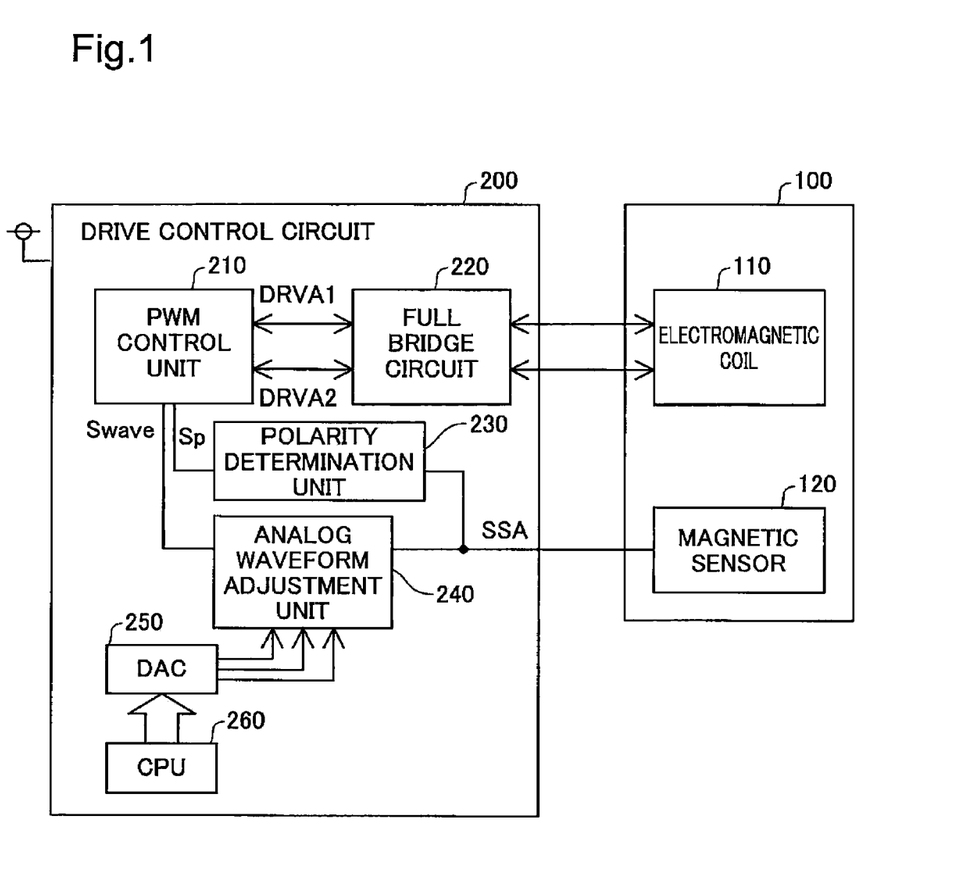
FIG. 1 is a block diagram showing the circuit configuration of the brushless motor of this embodiment.

FIG. 1 is a block diagram showing the circuit configuration of the brushless motor of the present embodiment. This brushless motor is equipped with a motor main unit 100 and a drive control circuit 200. The motor main unit 100 has an electromagnetic coil 110 and a magnetic sensor 120. The drive control circuit 200 is equipped with a PWM control unit 210, a full bridge circuit 220, a polarity determination unit 230, an analog waveform adjustment unit 240, a DA converter 250, and a CPU 260. The polarity determination unit 230 determines the positive polarity sections and the negative polarity sections of the analog output SSA of the magnetic sensor 120, and generates a polarity signal Sp. The analog waveform adjustment unit 240 adjusts the waveform of the analog sensor output SSA and generates an adjusted waveform signal Swave. The DA converter 250 supplies various types of setting values used for waveform adjustment to the analog waveform adjustment unit 240. Note that these setting values are values directed to the DA converter 250 from the CPU 260. The PWM control unit 210 executes PWM control based on the waveform signal Swave and the polarity signal Sp, and generates first and second PWM signals DRVA1 and DRVA2. Note that these signals DRVA1 and DRVA2 are also called "drive signals." The full bridge circuit 220 supplies drive voltage to the electromagnetic coil 110 according to the drive signals DRVA1 and DRVA2. The internal constitution of the circuits 210 to 250 will be described later. With the description hereafter, as can be seen from FIG. 1, we are describing a circuit for single phase drive using a single phase portion of the electromagnetic coil 110 and the magnetic sensor 120, but it is also possible to easily realize this by using the same constitution for each phase for a multi phase drive circuit of two phases or more. In this case, a circuit configuration having the electromagnetic coil 110 constitution and the magnetic sensor 120 constitution according to the phase count is used.

Figures 2A, 2B:
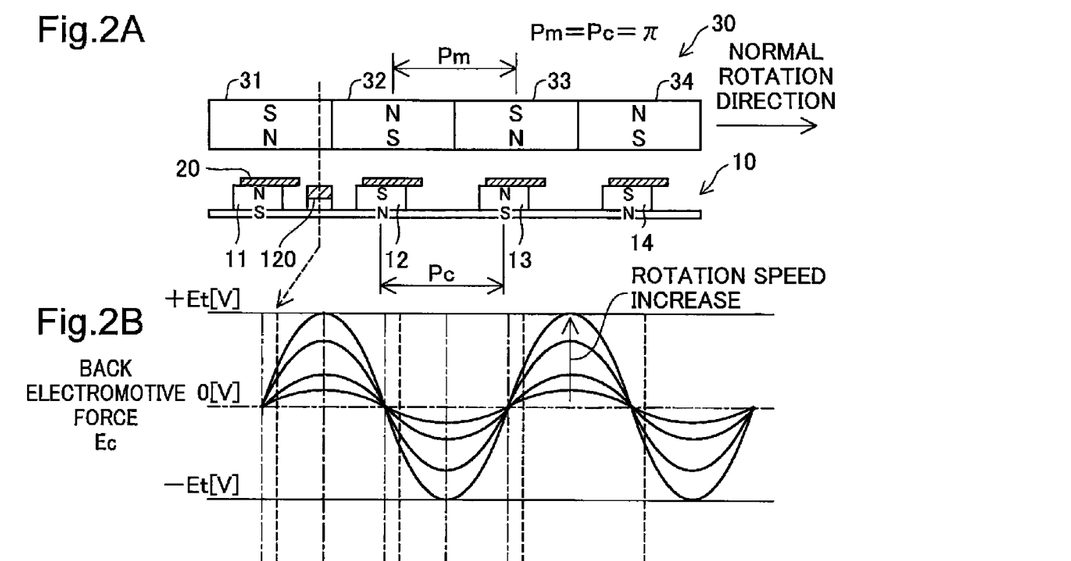
FIGS. 2A-2C show the positional relationship of a magnet array and a coil array with the motor main unit, and the relationship of the magnetic sensor output and the coil back electromotive force waveform.
Figure 2C:
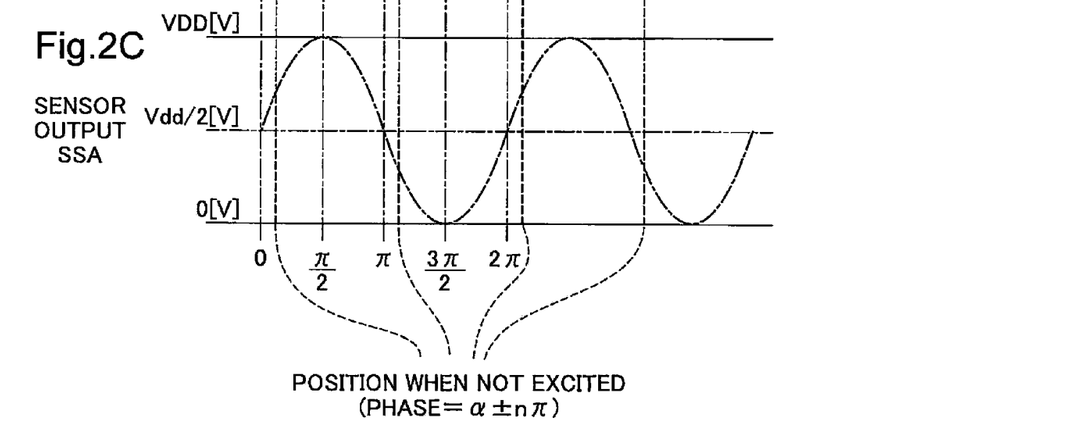

FIGS. 2A-2C show the positional relationship of a magnet array and a coil array with the motor main unit 110, and the relationship of the magnetic sensor output and the coil back electromotive force waveform. Note that "back electromotive force" is also called "induced voltage." As shown in FIG. 2A, the motor main unit has a stator unit 10 including a plurality of coils 11 to 14, and a rotor unit 30 including a plurality of magnets 31 to 34. The coils 11 to 14 correlate to the electromagnetic coil 110 in FIG. 1. The four magnets 31 to 34 are arranged at a fixed magnetic pole pitch Pm, and magnets adjacent to each other are magnetized in the reverse direction. Also, the coils 11 to 14 are arranged at a fixed pitch Pc, and coils adjacent to each other are excited in the reverse direction. With this example, the magnetic pole pitch Pm is equal to the coil pitch Pc, and with the electrical angle correlates to $\pi$. Note that the electrical angle $2\pi$ is correlated to the mechanical angle or distance that the drive signal phase moves when changed by $2\pi$. With this embodiment, when the phase of the drive signal changes by $2\pi$, the rotor unit 30 moves by twice the magnetic pole pitch Pm.

Of the four coils 11 to 14, the first and third coils 11 and 13 are driven by drive signals of the same phase, and the second and fourth coils 12 and 14 are driven by drive signals for which the phase is displaced by 180 degrees ($=\pi$) from the drive signals of the first and third coils 11 and 13. With normal two phase drive, the phase of the drive signals of the two phases (A phase and B phase) are displaced by 90 degrees ($=\pi/2$), and there is no case of the phase displacement being 180 degrees ($=\pi$). Also, with the motor drive method, there are many cases for which two drive signals for which the phase is displayed by 180 degrees ($=\pi$) are regarded as being the same phase. Therefore, the drive method for the motor of this embodiment can be thought of as being a single phase drive.

FIG. 2A shows the positional relationship of the magnets 31 to 34 and the coils 11 to 14 when the motor is stopped. With the motor of this embodiment, the magnetic yoke 20 at each coil 11 to 14 is provided at a position displaced slightly in the normal rotation direction of the rotor unit 30 from the center of each coil. Therefore, when the motor is stopped, the magnetic yoke 20 of each coil is attracted by the magnets 31 to 34, and the rotor unit 30 stops at the position for which the magnetic yoke 20 faces the center of each magnet 31 to 34. As a result, the motor stops at the position for which the center of each coil 11 to 14 is displaced from the center of each magnet 31 to 34. Also, at this time, the magnetic sensor 120 is also at a position slightly displaced from the boundary of the adjacent magnet. The phase at this stop position is $\alpha$. The phase $\alpha$ is not zero, but it is preferable to be set to a small value close to zero (e.g. approximately 5 to 10 degrees), or a value close to $\pi/2$ (e.g. approximately 85 to 95 degrees).

FIG. 2B shows an example of the waveform of the back electromotive force generated at the coil, and FIG. 2C shows an example of the output waveform of the magnetic sensor 120. The magnetic sensor 120 can generate analog sensor output SSA of almost the same shape as the back electromotive force of the coil when the motor is operating. However, the output SSA of the magnetic sensor 120 shows a value that is not 0 even when the motor is stopped (except when the phase is an integral magnitude of $\pi$). Note that the back electromotive force of the coil has a tendency to rise with the motor rotation speed, but the waveform shape (sine wave) is kept at almost the same shape. As the magnetic sensor 120, for example, it is possible to use a Hall IC which uses the Hall effect. With this example, the sensor output SSA and the back electromotive force Ec are both sine wave shapes or waveforms close to a sine wave. As described later, the drive control circuit of this motor uses the sensor output SSA and applies to each coil 11 to 14 a voltage of almost the same waveform as the back electromotive force Ec.

Figure 3:
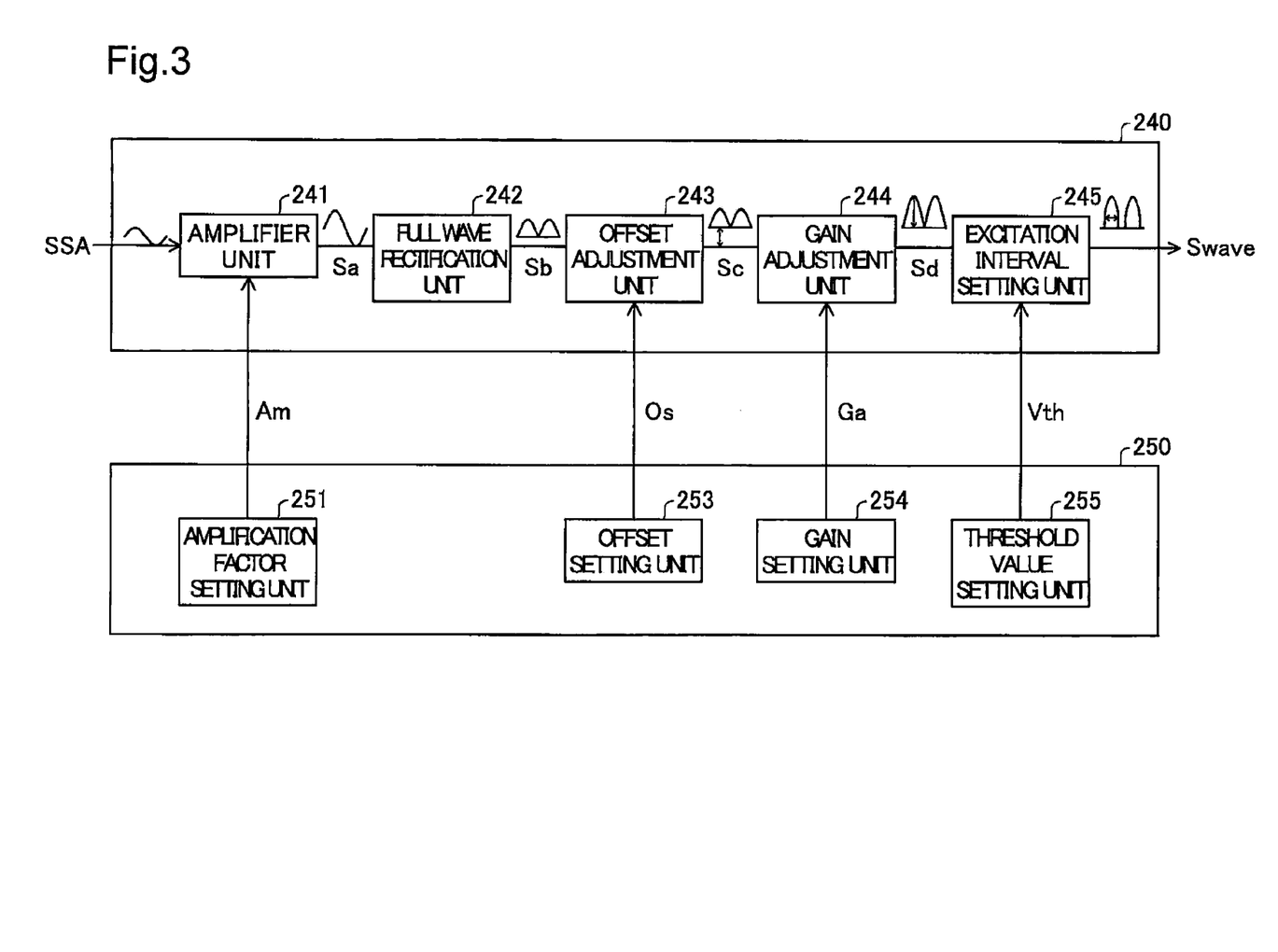
FIG. 3 is a block diagram showing the internal constitution of the analog waveform adjustment unit and the DA converter.

FIG. 3 is a block diagram showing the internal constitution of the analog waveform adjustment unit 240 and the DA converter 250. The analog waveform adjustment unit 240 has an amplifier unit 241, a full wave rectification unit 242, an offset adjustment unit 243, a gain adjustment unit 244, and an excitation interval setting unit 245. The DA converter 250 has an amplification factor setting unit 251 for setting an amplification factor Am, an offset setting unit 253 for setting an offset value Os, a gain setting unit 254 for setting a gain value Ga, and a threshold value setting unit 255 for setting a threshold voltage Vth. Each setting unit 251, 235-255 inside the DA converter 250 does DA conversion of each type of setting value given from the CPU 260 (FIG. 1), and supplies the various setting values Am, Os, Ga, and Vth as analog signals to each corresponding unit inside the analog waveform adjustment unit 240.

Figure 4A:
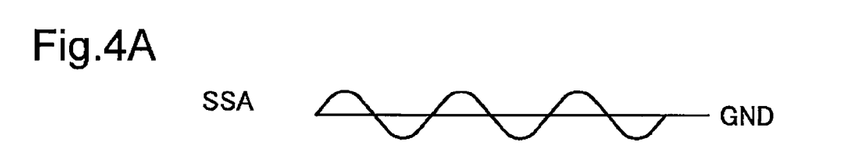
FIGS. 4A-4F are timing charts showing the waveform of the input/output signal of each unit of the analog waveform adjustment unit.
Figure 4B:
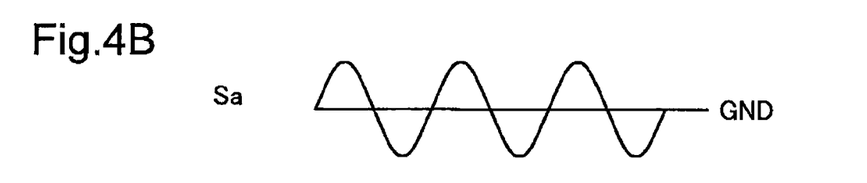
Figure 4C:
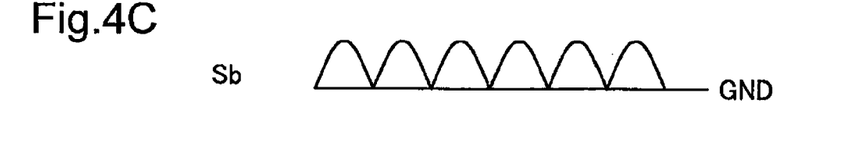
Figure 4D:
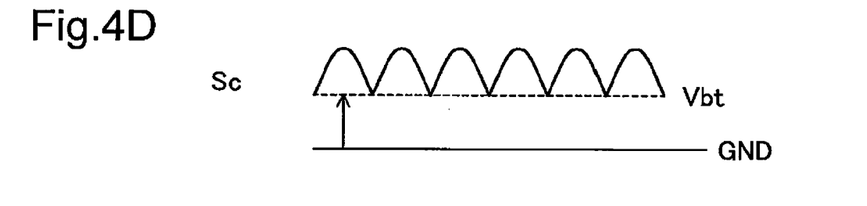
Figure 4E:
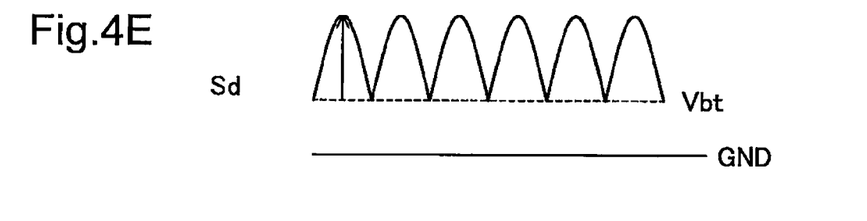
Figure 4F:
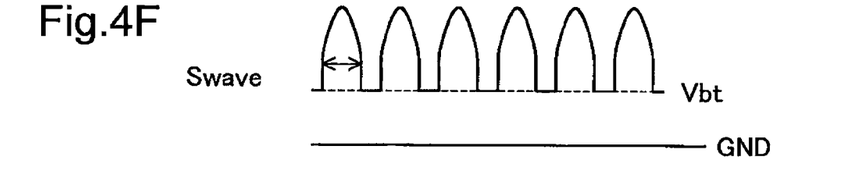

FIGS. 4A-4F are timing charts showing the waveform of the input/output signal of each unit of the analog waveform adjustment unit 240. The sensor output SSA (FIG. 4A) has an almost symmetrical waveform with the ground potential GND as the center. The sensor output SSA preferably has a sine wave shape. The amplifier unit 241 generates the post-amplification signal Sa (FIG. 4B) by amplifying this sensor output SSA using the amplification factor Am. The full wave rectification unit 242 generates a full wave rectification signal Sb (FIG. 4C) by doing full wave rectification of this post-amplification signal Sa. The offset adjustment unit 243 generates the signal Sc for which the reference level of the full wave rectification signal Sa is offset according to the offset value Os, and the gain adjustment unit 244 generates the signal Sd for which this signal Sc is amplified according to the gain value Os (FIGS. 4D and 4E). Note that FIG. 4D illustrates a rise in the reference level of the signal Sb by Vbt volts according to the offset value Os. The excitation interval setting unit 245 generates a signal Swave for which only part of the signal Sd is valid and the other part is invalid according to the threshold voltage Vth (FIG. 4F). The internal constitution and operation of the excitation interval setting unit 245 will be described later.

Note that with the analog waveform adjustment unit 240, the reason for adjusting the offset and the gain is because there is a possibility of the waveform being distorted due to sensor attachment error or the like because the sensor output SSA does not necessarily have a desirable waveform (a sine wave shape, for example). When the waveform of the sensor output SSA is distorted, by adjusting the offset and gain, it is possible to come closer to a desirable waveform. Also, as a result, it is possible to increase the motor efficiency.

Figure 5A:
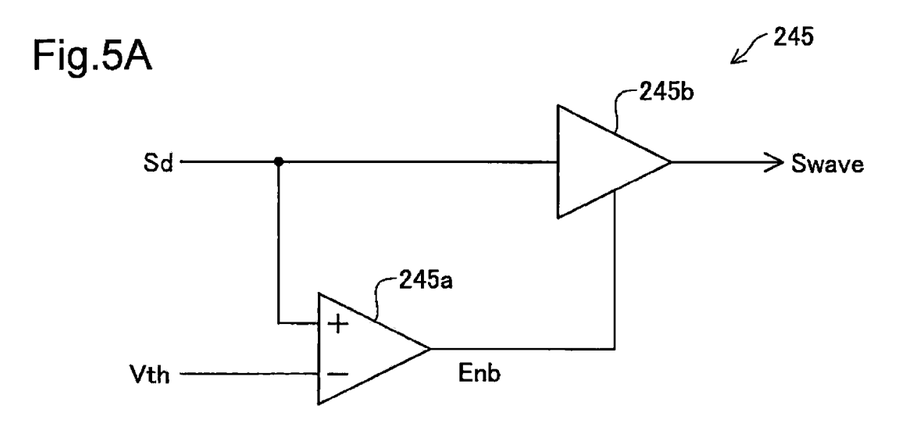
FIGS. 5A and 5B shows the internal constitution and operation of the excitation interval setting unit.
Figure 5B:
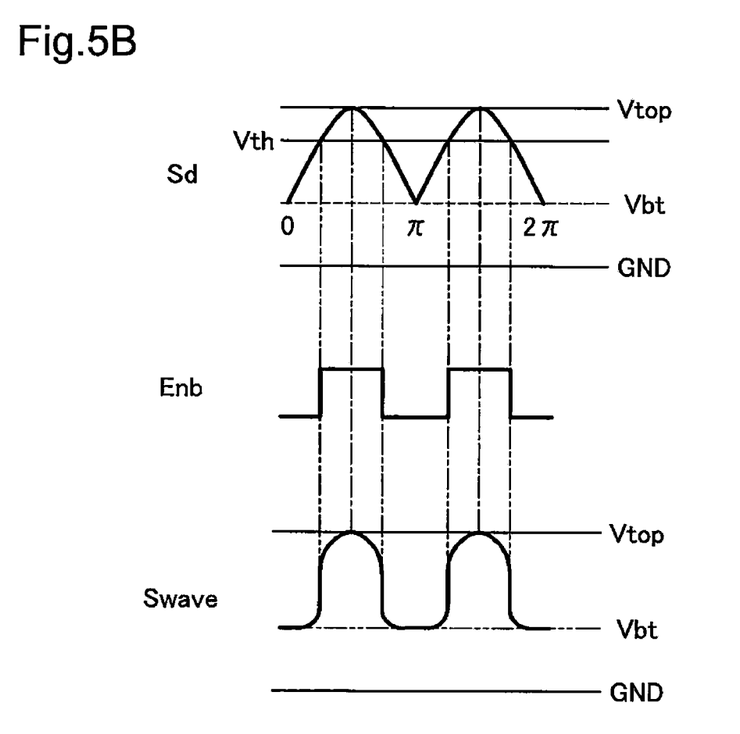

FIGS. 5A and 5B show the internal constitution and operation of the excitation interval setting unit 245. This excitation interval setting unit 245 has an analog comparator 245a and a buffer circuit 245b. The analog comparator 245a compares the signal Sd after the offset/gain adjustment and the threshold voltage Vth, to produce an enable signal Enb which goes to H level when Vth≦Sd (see FIG. 5B). This enable signal Enb is supplied to the enable terminal of the buffer circuit 245b. When the enable signal Enb is H level, voltage which is proportionate to the signal Sd is output from the buffer circuit 245b, and when the enable signal Enb is L level, output from the buffer circuit 245b stops. As a result, as shown in FIG. 5B, the output signal Swave of the excitation interval setting unit 245 becomes a signal for which only part of the signal Sd is valid and the other part is invalid. Following, the output signal Swave of the excitation interval setting unit 245 is called the "adjusted waveform signal."

As can be understood from FIGS. 4A-4F as well, the signal Sd after the offset/gain adjustment has a waveform similar to the signal for which the sensor output SSA underwent full wave rectification, so the enable signal Enb (FIG. 5B) has a cycle correlating to the half cycle of the sensor output SSA. Therefore, when the position at which the sensor output SSA polarity reverses is defined to be the π phase point, it can be understood that the enable signal Enb makes the signal Sd valid in the symmetrical valid section with the π/2 phase point as the center, and makes the signal Sd invalid in the symmetrical invalid section with the π phase point as the center. This kind of excitation interval setting unit 245 has a function of improving the motor efficiency, and this point will be described later.

Note that the combination of the offset adjustment unit 243, the gain adjustment unit 244, and the excitation interval setting unit 245 functions as an adjustment unit that adjusts the waveform of the full wave rectification signal Sb. The sequence of the gain adjustment and the offset adjustment may be reversed. It is also possible to omit part of the units 241 to 245 in the analog waveform adjustment unit 240. For example, it is possible to omit circuits 241, and 243 to 245, other than the full wave rectification unit 242.

Figure 6A:
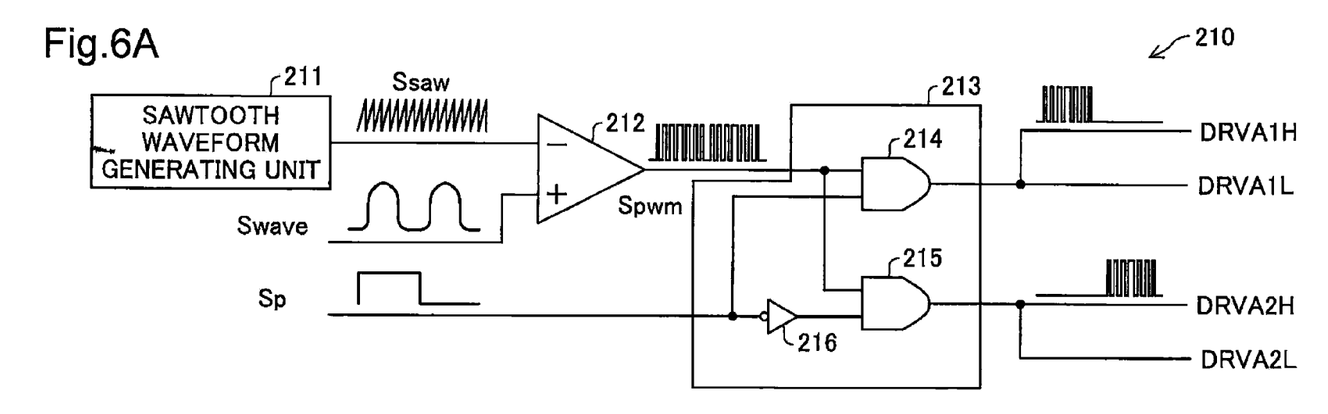
FIGS. 6A and 6B are block diagram showing an example of the internal constitution of the PWM control unit.
Figure 6B:
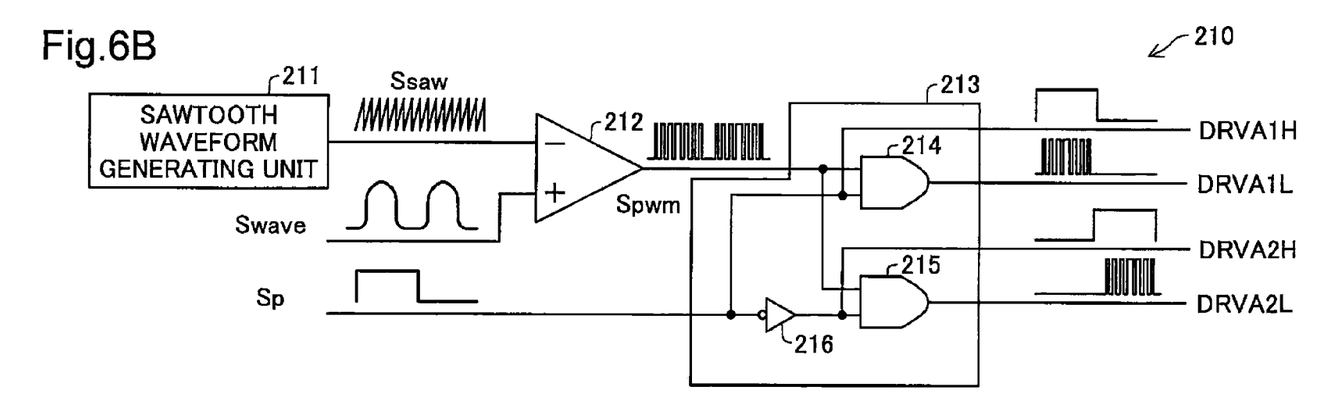

FIGS. 6A and 6B are block diagrams showing an example of the internal constitution of the PWM control unit 210 (FIG. 1). With the example shown in FIG. 6 A, the PWM control unit 210 is equipped with a sawtooth waveform generating unit 211, an analog comparator 212, and a PWM waveform shaping circuit 213. The sawtooth waveform generating unit 211 is a circuit for generating fixed cycle sawtooth wave signals Ssaw. However, the cycle of the sawtooth wave signals may be changed as necessary. The analog comparator 212 generates an original PWM signal Spwm by comparing this sawtooth wave signal Ssaw and the adjusted waveform signal Swave supplied from the analog waveform adjustment unit 240.

The PWM waveform shaping circuit 213 generates the first PWM signal DRVA1 and the second PWM signal DRVA2 based on this original PWM signal Spwm and on the polarity signal Sp given from the polarity determination unit 230. Note that the polarity signal Sp, as described previously, is a signal that is H level in the positive polarity section for which the sensor output SSA is positive, and is L level in the negative polarity section for which the sensor output SSA is negative. The PWM waveform shaping circuit 213 has two AND circuits 214 and 215 and an inverter (NOT circuit) 216. The first AND circuit 214 allows the original PWM signal Spwm to pass through as is when the polarity signal Sp is H level, and blocks passage of the original PWM signal Spwm when the polarity signal Sp is L level, to thereby generate the first PWM signal DRVA1. A reverse signal of the polarity signal Sp is input to the second AND circuit 215. Therefore, the second AND circuit 215 blocks the passage of the original PWM signal Spwm when the polarity signal Sp is H level, and also allows the original PWM signal Spwm to pass through as is when the polarity signal Sp is L level, to thereby generate the second PWM signal DRVA2.

Note that with the example in FIG. 6A, the signal DRVA1H is the drive signal supplied to the upper arm transistor of the full bridge circuit 220, and the signal DRVA1L is the drive signal supplied to the lower arm transistor of the full bridge circuit 220, but with the example in FIG. 6A, these signals DRVA1H and DRVA1L are the same. The same is true for the signals DRVA2H and DRVA2L.

With the circuit of FIG. 6B, of the first PWM signals DRVA1H and DRVA1L, as the upper arm side signal DRVA1H, the polarity signal Sp is used as is. Also, of the second PWM signals DRVA2H and DRVA2L, as the upper arm side signal DRVA2H, a reversed signal of the polarity signal Sp is used. It is possible to suitably control the full bridge circuit 220 when using the constitution of either one of FIGS. 6A and 6B.

As can be understood from FIGS. 6A and 6B, with the PWM control unit 210, the waveform signal Swave adjusted by the analog waveform adjustment unit 240 is used, so it is possible to execute PWM control on a signal Swave which has a desirable waveform. In particular, the excitation interval setting unit 245 of the analog waveform adjustment unit 240 has the special feature of functioning so as to keep the signal Swave at L level near the zero cross point of the sensor output SSA. Near the zero cross point of the sensor output SSA, even when drive voltage is applied to the coil, a valid drive force is not achieved, and this causes vibration and noise. Therefore, by adjusting the waveform using the excitation interval setting unit 245, it is possible to increase the motor efficiency.

Figure 7:
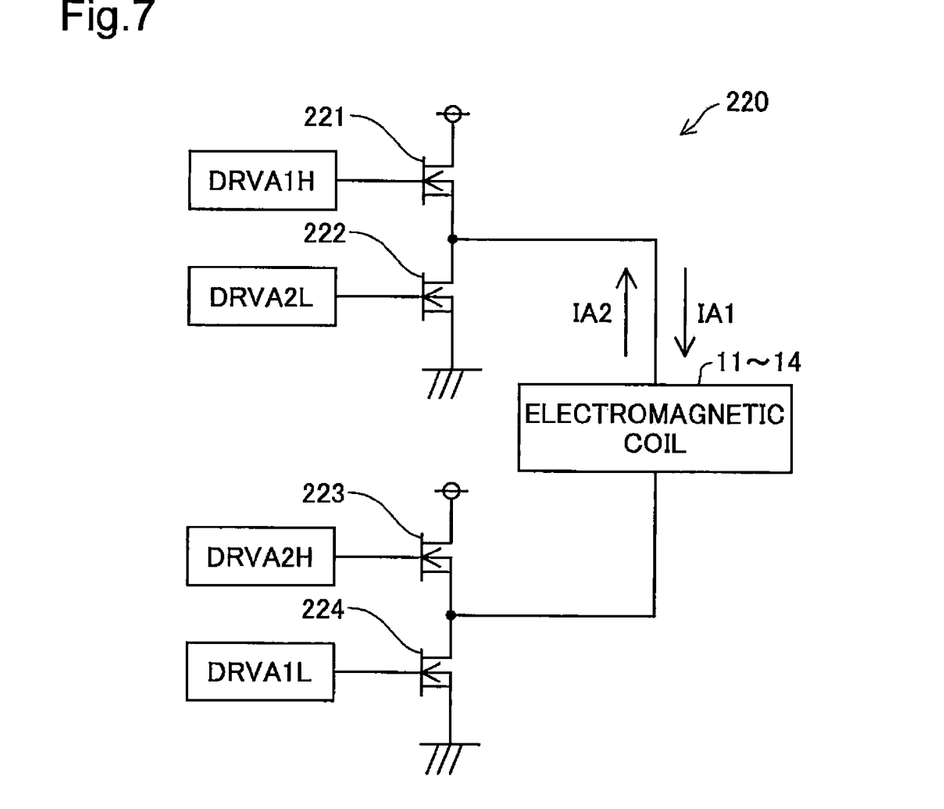
FIG. 7 is a block diagram showing the internal constitution of the full bridge circuit.

FIG. 7 is a block diagram showing the internal constitution of the full bridge circuit 220. The full bridge circuit 220 includes four switching transistors 221 to 224. The PWM signal DRVA1H, DRVA2L, DRVA2H, and DRVA2L described above are input to the control terminals of these switching transistors 221 to 224. Note that it is also possible to provide a level shifter circuit in front of the control terminals of the upper arm transistors 221 and 223, so as to adjust the level of the drive signals DRVA1H and DRVA2H.

Figure 8A:
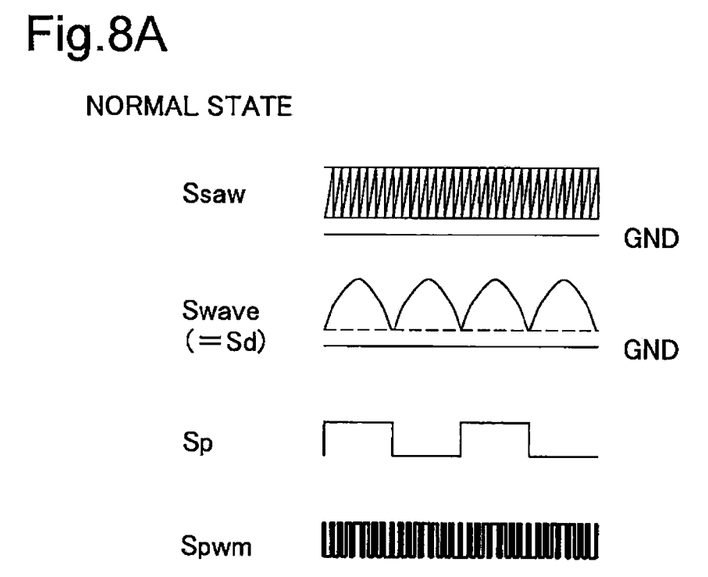
FIGS. 8A and 8B show an example of the pulse width adjustment with the drive control circuit of this embodiment.
Figure 8B:
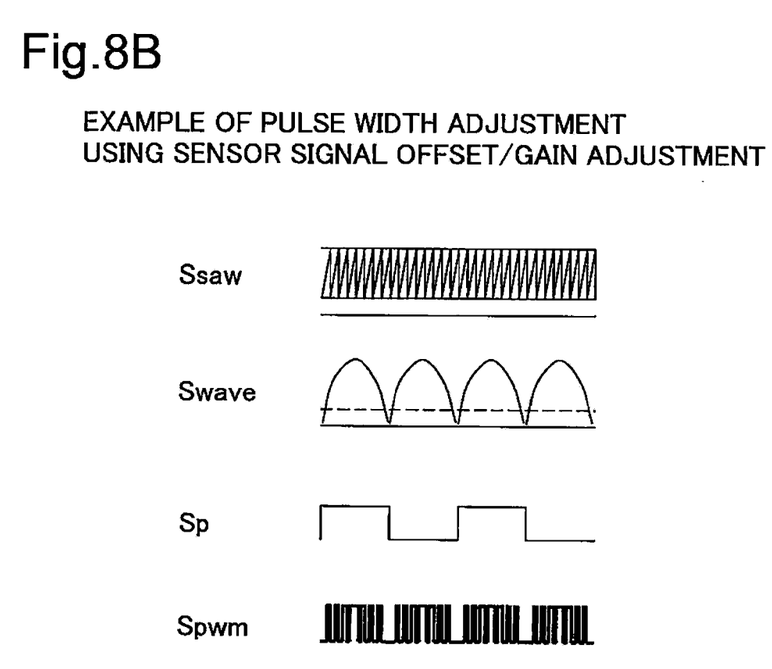

FIGS. 8A and 8B show an example of the pulse width adjustment with the drive control circuit of this embodiment. FIG. 8A shows the normal state. With this normal state, adjustment is not performed by the excitation interval setting unit 245, and the signal Sd after the offset/gain adjustment (or the full wave rectification signal Sb) is used as is as the adjusted waveform signal Swave. The original PWM signal Spwm is a square waveform pulse signal which simulates the voltage level change of the adjusted waveform signal Swave; so the original PWM signal Spwm is a signal for which pulses are generated with almost all the sections. FIG. 8B shows an example where the pulse width of the original PWM signal Spwm is adjusted by changing the offset adjustment and the gain adjustment from the normal state of FIG. 8A. As shown with this example, it is possible to adjust the pulse width of the original PWM signal Spwm and thus to control the operation of the motor by changing at least either one of the offset adjustment and the gain adjustment.

Figure 9A:
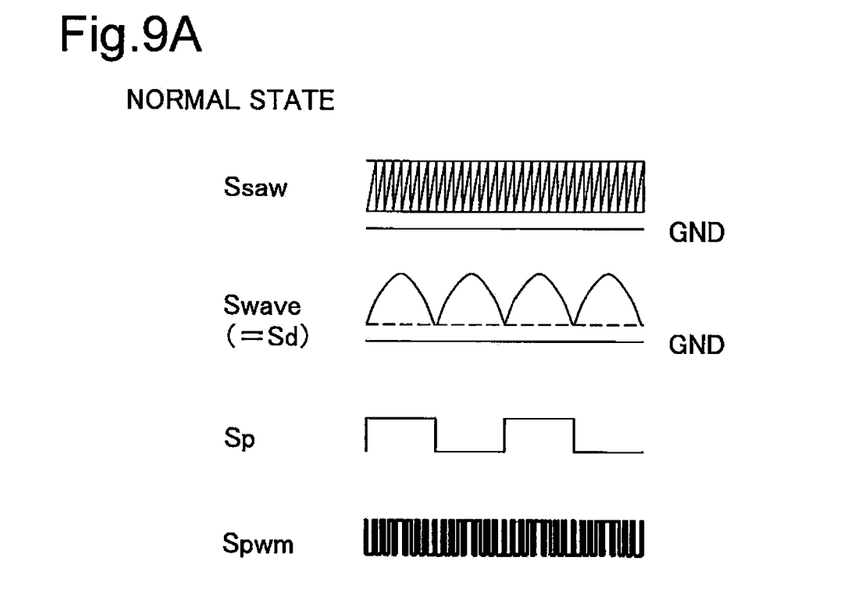
FIGS. 9A and 9B show another example of the pulse width adjustment with the drive control circuit of this embodiment.
Figure 9B:
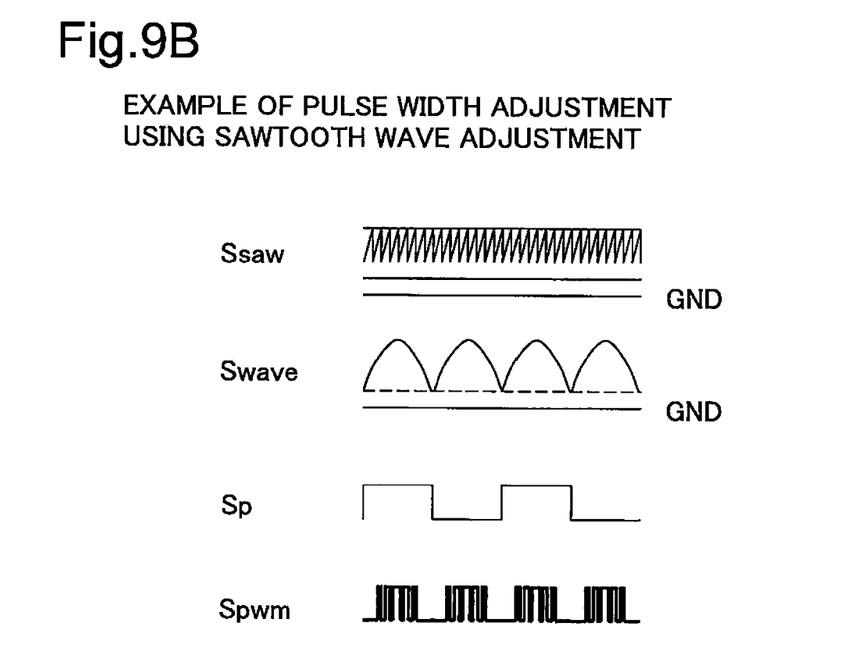

FIGS. 9A and 9B show another example of the pulse width adjustment with the drive control circuit of this embodiment. FIG. 9A shows the same normal state as FIG. 8A. FIG. 9B shows an example where the pulse width of the original PWM signal Spwm is adjusted by changing the sawtooth wave signal Ssaw from the normal state of FIG. 9A. As shown with this example, it is possible to adjust the pulse width of the original PWM signal Spwm and thus to control the operation of the motor by changing the waveform of the sawtooth wave signal.

With the embodiment noted above, the PWM signals DRVA1 and DRVA2 are generated from the sensor output SSA using an analog circuit, so it is possible to generate the PWM signal with a simpler constitution than when using a digital circuit. Also, the sensor output SSA underwent full wave rectification with the analog waveform adjustment unit 240, and PWM control is executed using the signal after the full wave rectification, so compared to when executing PWM control using a signal which has both positive and negative waveform sections, it is possible to simplify the circuit configuration. Furthermore, the analog waveform adjustment unit 240 includes the excitation interval setting unit 245 (valid signal interval setting unit) that sets only part of the signal after full wave rectification as valid, and sets the other part as invalid, so it is possible to increase motor efficiency.

B. Variation Examples

Note that this invention is not limited to the embodiments and implementation modes noted above, and it is possible to implement various modes in a scope that does not stray from the key points, with the following variations being possible, for example.

B1. Variation Example 1

With the embodiment noted above, the sawtooth wave signal Ssaw is used as the PWM control carrier signal, but it is also possible to use another signal such as a triangle wave or the like as the carrier signal.

B2. Variation Example 2

With the embodiment noted above, a single phase brushless motor is used as the motor, but the present invention may be applied to other various motors. It is also possible to use any value for the motor pole number and the phase count.

B3. Variation Example 3

With the embodiment noted above, a motor is used as the device to be controlled which is controlled by the PWM control circuit, but the present invention may be applied to circuits for controlling devices to be controlled other than a motor.

B4. Variation Example 4

The present invention are applicable to various devices and apparatuses. For example, the present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive. Motors in accordance with the present invention may be also employed in a moving body and a robot.

Figure 10:
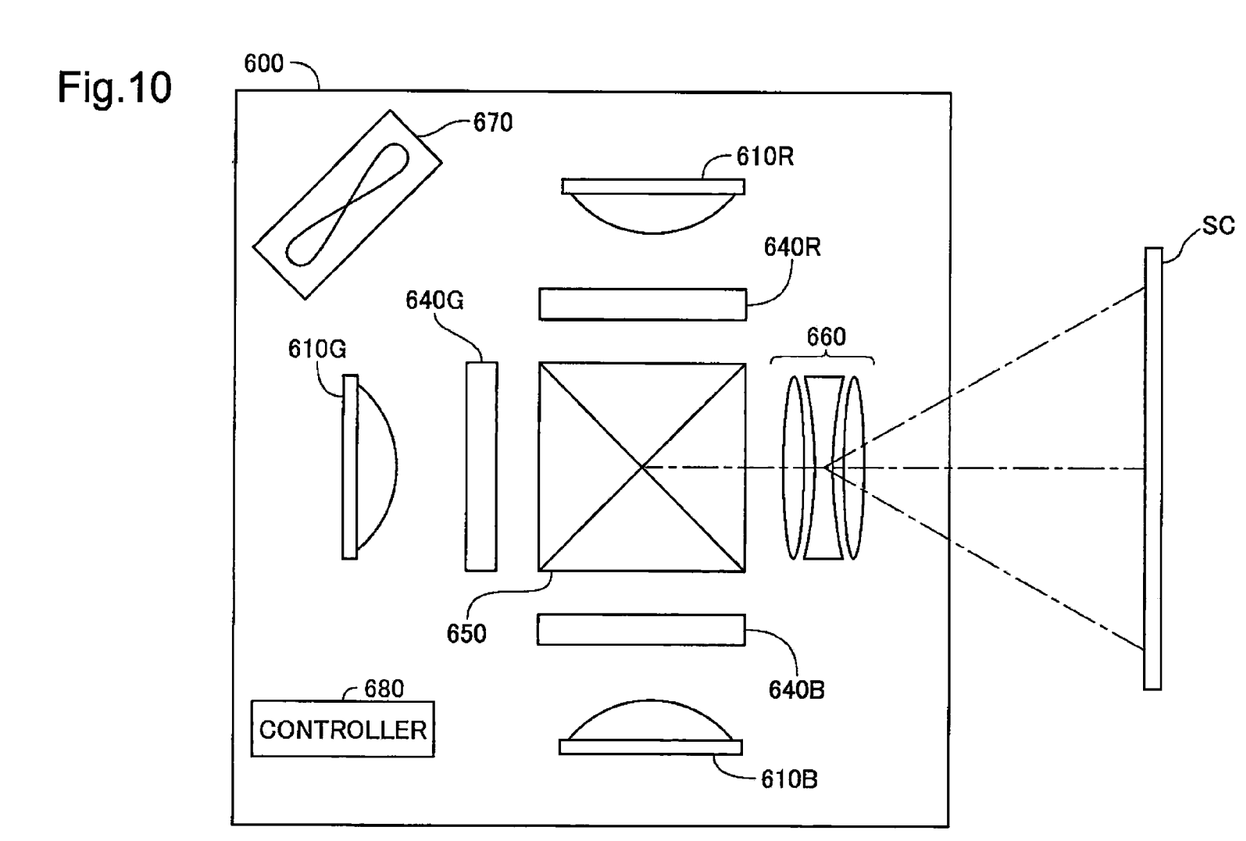
FIG. 10 illustrates a projector utilizing a motor according to a mode of the present invention.

FIG. 10 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 11A:
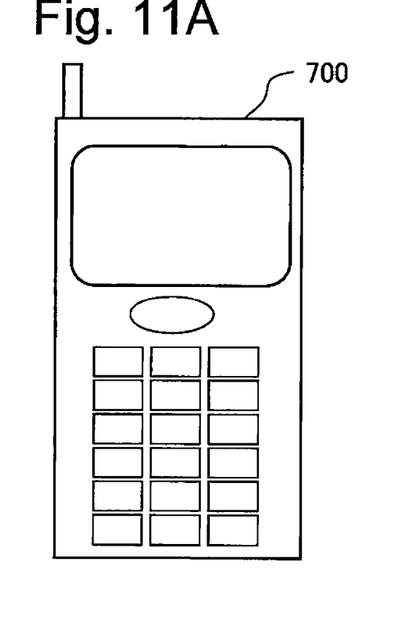
FIGS. 11A-11C illustrate a mobile phone of fuel cell type utilizing a motor according to a mode of the present invention.
Figure 11B:
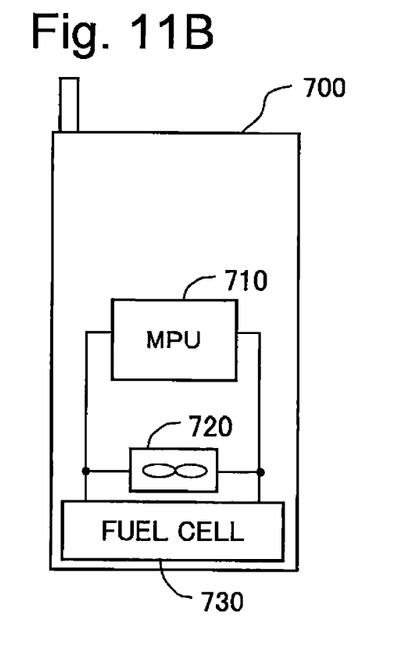
Figure 11C:
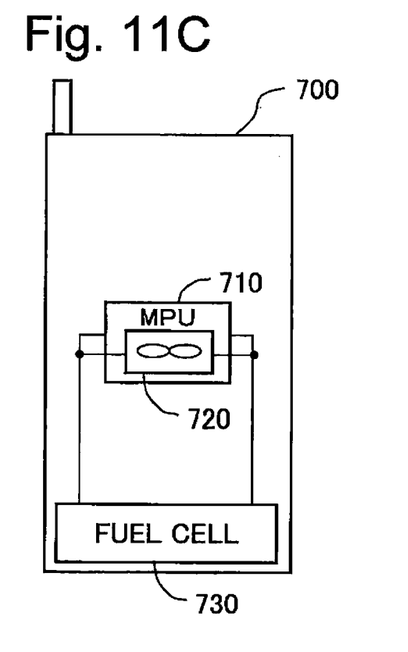

FIGS. 11A-11C illustrate a mobile phone utilizing a motor according to the present invention. FIG. 11A shows the external view of a mobile phone 700, and FIG. 11B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 11C, to cool the MPU 710. Various rotation type brushless motors described above can be used as the motor for driving the fan 720.

Figure 12:
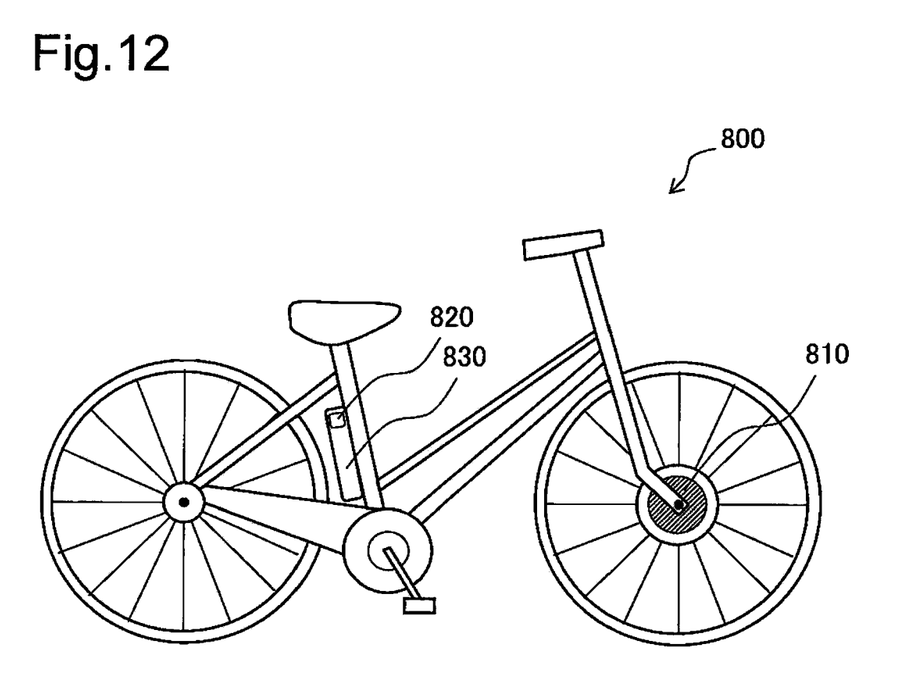
FIG. 12 illustrates an electric bicycle (power-assisted bicycle) as an example of a moving vehicle utilizing a motor/generator according to a mode of the present invention.

FIG. 12 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 13:
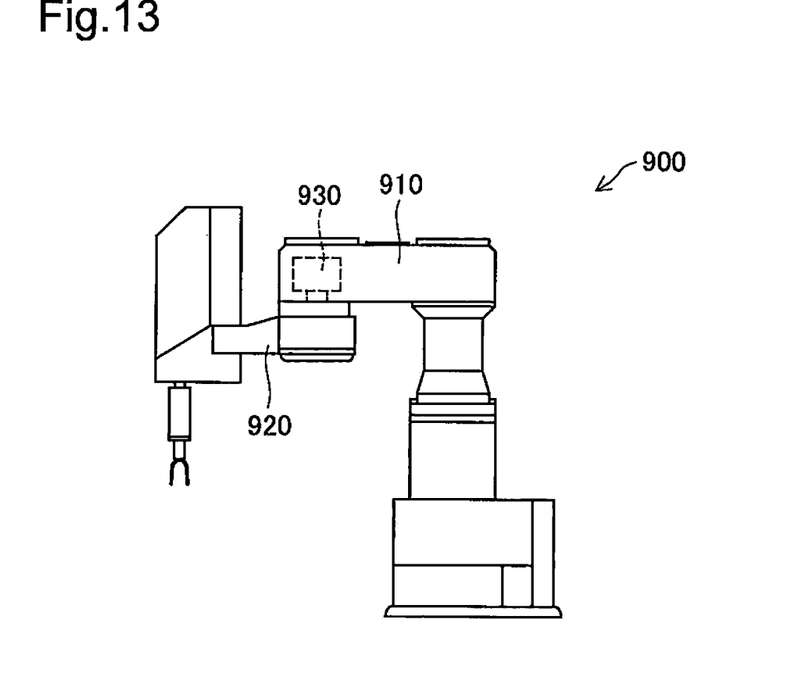
FIG. 13 illustrates an example of a robot utilizing a motor according to a mode of the present invention.

FIG. 13 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

What is claimed is:

1. A PWM control circuit that generates PWM signals based on an analog sensor output from a sensor provided in a device to be controlled, comprising:
a polarity determination unit that generates a polarity signal based on positive polarity sections and negative polarity sections of the analog sensor output;
a full wave rectification unit that generates a full wave rectification signal by doing full rectification of the analog sensor output;
an adjustment unit that generates an adjusted waveform signal based on waveform of the full wave rectification signal; and
a PWM waveform shaping unit that generates a first PWM signal for the positive polarity section and a second PWM signal for the negative polarity section, based on the polarity signal and the adjusted waveform signal, wherein the adjusted waveform signal includes a part of the full wave rectification signal and excludes the other part of the full wave rectification signal.

2. The PWM control circuit in accordance with claim 1, wherein when a position at which the polarity of the analog sensor output is reversed is defined as a $(n-1)\pi$ phase point where n is an integer of at least one, said part of the full wave rectification signal includes a $(2n-1)\pi/2$ phase point of the full wave rectification signal.

3. The PWM control circuit in accordance with claim 1, wherein the PWM waveform shaping unit includes:

a carrier signal generating unit that generates a fixed frequency carrier signal; and a comparator that generates an original PWM signal by comparing the adjusted waveform signal and the carrier signal.

4. The PWM control circuit in accordance with claim 1, wherein when a position at which the polarity of the analog sensor output is reversed is defined as a $(n-1)\pi$ phase point where n is an integer of at least one, the valid signal interval setting unit outputs the full wave rectification signal in a symmetrical output section whose center is at a $(2n-1)\pi/2$ phase point, and does not output the full wave rectification signal in a symmetrical non-output section whose center is at the $(n-1)\pi$ phase point.

5. The PWM control circuit in accordance with claim 1, wherein the adjustment unit includes:

an offset/gain adjustment unit that adjusts offset and gain of the full wave rectification signal.

6. A method of generating PWM signals based on an analog sensor output from a sensor provided in a device to be controlled, comprising:

(a) generating a polarity signal based on positive polarity sections and negative polarity sections of the analog sensor output;

(b) generating a full wave rectification signal by doing full rectification of the analog sensor output;

(c) generating an adjusted waveform signal based on waveform of the full wave rectification signal; and (d) generating a first PWM signal for the positive polarity section and a second PWM signal for the negative polarity section, based on the polarity signal and the adjusted waveform signal, wherein the adjusted waveform signal includes a part of the full wave rectification signal and excludes the other part of the full wave rectification signal.

7. The method according to claim 6, wherein the step (d) includes:

generating a fixed frequency carrier signal; and
generating an original PWM signal by comparing the adjusted waveform signal and the carrier signal.

8. The method in accordance with claim 6, wherein
when a position at which the polarity of the analog sensor output is reversed is defined as a $(n-1)\pi$ phase point where n is an integer of at least one, said part of the full wave rectification signal includes a $(2n-1)\pi/2$ phase point of the full wave rectification signal.

9. The method in accordance with claim 7, wherein
when a position at which the polarity of the analog sensor output is reversed is defined as a $(n-1)\pi$ phase point where n is an integer of at least one, said part of the full wave rectification signal includes a $(2n-1)\pi/2$ phase point of the full wave rectification signal.

10. A PWM control circuit that generates PWM signals based on an analog sensor output from a sensor provided in a device to be controlled, comprising:

a polarity determination unit that generates a polarity signal based on positive polarity sections and negative polarity sections of the analog sensor output;

a full wave rectification unit that generates a full wave rectification signal by doing full rectification of the analog sensor output;

an adjustment unit that generates an adjusted waveform signal based on waveform of the full wave rectification signal; and a PWM waveform shaping unit that generates a first PWM signal for the positive polarity section and a second PWM signal for the negative polarity section, based on the polarity signal and the adjusted waveform signal, wherein the adjusted waveform signal includes only a part of the full wave rectification signal.

11. The PWM control circuit in accordance with claim 10, wherein when a position at which the polarity of the analog sensor output is reversed is defined as a $(n-1)\pi$ phase point where n is an integer of at least one, said part of the full wave rectification signal includes a $(2n-1)\pi/2$ phase point of the full wave rectification signal.

12. The PWM control circuit in accordance with claim 10, wherein the PWM waveform shaping unit includes:

a carrier signal generating unit that generates a fixed frequency carrier signal; and a comparator that generates an original PWM signal by comparing the adjusted waveform signal and the carrier signal.

13. The PWM control circuit in accordance with claim 10, wherein when a position at which the polarity of the analog sensor output is reversed is defined as a $(n-1)\pi$ phase point where n is an integer of at least one, the valid signal interval setting unit outputs the full wave rectification signal in a symmetrical output section whose center is at a $(2n-1)\pi/2$ phase point, and does not output the full wave rectification signal in a symmetrical non-output section whose center is at the $(n-1)\pi$ phase point.

14. The PWM control circuit in accordance with claim 10, wherein the adjustment unit includes:

an offset/gain adjustment unit that adjusts offset and gain of the full wave rectification signal.

* * * * *